Patented Dec. 15, 1942

2,305,103

UNITED STATES PATENT OFFICE 2,305,103

PURIFICATION OF NITRILES

Walter V. Osgood, Wilmington, Del., assignor to E. I. du Pont de Nemours & Company, Wilmington, Del., a corporation of Delaware No Drawing. Application May 20, 1941, Serial No. 394,289

14 Claims. (Cl. 260—464)

This invention relates to the purification of aliphatic dinitriles and more particularly to the purification of adiponitrile.

In the preparation of hexamethylenediamine, which has detergent, insecticidal, emulsifying and other valuable properties, adiponitrile may be hydrogenated in the presence of ammonia, in a manner such as that described in U. S. Patent 2,166,151. In this process, adiponitrile is subjected to hydrogenation in the presence of ammonia and an active hydrogenation catalyst at elevated temperatures and pressures. However, it has been found that in application of this process to continuous hydrogenation of adiponitrile to hexamethylenediamine there is a major problem of short catalyst life and lowering yields which detracts from efficiency of the continuous operation.

I have found that the lower yields of hexamethylenediamine and short catalyst life in continuous adiponitrile hydrogenation are due to the effect of various impurities which are present in ordinary adiponitrile, such as in the case of aliphatic dinitriles prepared by the catalytic dehydration of the corresponding ammonia-acid derivative at elevated temperature. I do not wish to be limited by the explanation but I believe that some of the impurities present in adiponitrile are: hydrogen cyanide; adipamic acid; delta-cyanovaleric acid; delta-cyanovaleramide; 2-cyanocyclopentylidimine; 2-cyanocyclopentanone; cyclopentanone; dicyclopentylidine; tricyclotrimethylene benzene; 1,1-tetramethylenecyclohexanone; 2,3 - cyclopentenocycloheptanone; pyrrole; and other unidentified compounds containing imino groups, amine type compounds and the like.

It is an object of the present invention to provide a process for purifying impure adiponitrile. Other objects and advantages of the invention will be apparent from the following specification.

I have discovered that aliphatic dinitriles, and particularly adiponitrile, of excellent quality, suitable for continuous hydrogenation, may be prepared by treating impure aliphatic dinitriles with an oxidizing agent such as sodium or potassium permanganate, sodium or potassium dichromate and the like, followed by aqua ammonia washing and final distillation of the resultant treated adiponitrile. The refined product obtained according to this process is a practically pure compound. In practicing the invention, the oxidizing agent, preferably potassium permanganate or sodium dichromate, may be added to the adiponitrile in water solution, in water solution with sulfuric acid, or as solid crystals. Addition of the solid crystals apparently gives the most satisfactory purification. Furthermore, the preferred process involves slowly adding the crystalline oxidizing agent, potassium permanganate, at the approximate rate at which it is being reduced by the nitrile impurities. In the neighborhood of 2–4 hours is, in general, a sufficient time for addition.

Following potassium permanganate treatment of adiponitrile, the product should be washed with aqua ammonia, filtered and thereafter distilled. The adiponitrile which dissolves in the treating solution (preferably sulfuric acid-potassium permanganate-water) and the washing solutions (water-ammonia) may be recovered by first being made alkaline with ammonia and evaporated and the resultant liquid cooled until two layers are formed. The upper layer contains most of the adiponitrile and it may be decanted, washed with an equal volume of water and then recycled to the permanganate-treated nitrile for aqua ammonia washing. The distillation foreshots and residues are either recirculated to the original adiponitrile charge or are subjected to further separate potassium permanganate treatments. Following the procedures of the present invention, it is possible to recover 90–95% of the pure adiponitrile in the crude adiponitrile, this recovered product being suitable for continuous hydrogenation.

Although the potassium permanganate treatment of crude adiponitrile has been described as involving the presence of varying amounts of water, the water is not necessary, although its presence does aid in effecting the best results. Similarly, although it is preferred to carry out the permanganate treatment in the presence of sulfuric acid, other inorganic acids may also be employed. One to four parts by weight of sulfuric acid per part of potassium permanganate gives desirable results. The temperature employed in the treatment of adiponitrile with an oxidizing agent may vary over a wide range, but preferably temperatures under 50° C. are maintained.

The treatment may also be carried out in neutral and alkaline solutions but the potassium permanganate requirements are higher than when acid solutions are employed.

The yield of hexamethylenediamine from adiponitrile, as previously outlined, and the maintenance of catalyst activity and life are greatly improved when the adiponitrile is first treated according to the process of this invention.

The following examples will illustrate how the present invention may be practiced.

EXAMPLE 1

One hundred parts by weight adiponitrile which had been semi-refined by batch distillation, 16 parts of concentrated $H_2SO_4$, and 64 parts of water were stirred together in a stainless steel kettle at atmospheric pressure and 35° C. 3.5 parts of solid $KMnO_4$ was slowly added over a period of four hours. The whole mixture was vigorously agitated during the entire period of $KMnO_4$ addition and for one hour thereafter. The temperature was maintained below 50° C. The agitation was stopped and the mixture allowed to separate into two layers. The lower layer containing most of the water, acid, reduced manganese salts and saturated with adiponitrile, was withdrawn. (The upper layer was retained in the kettle.) The $KMnO_4$-treated adiponitrile in the lower layer was washed 5 times with aqua ammonia as follows: To each 100 parts was added 20 parts of a solution consisting of 2 parts ammonia and 18 parts of water. The mixture was agitated for one hour at atmospheric pressure and held between 30° C. and 50° C. The agitation was then stopped and the mixture allowed to break into two layers. The lower (water-ammonia) layer was withdrawn. This procedure was repeated four more times.

The treated and washed adiponitrile was filtered and fractionally distilled. A heart cut of approximately 60 parts, per 100 parts impure adiponitrile charged to the $KMnO_4$ treatment, was obtained. The phrase "heart cut" is generally accepted as defining the major part of the liquid or fraction being distilled, with the highest and lowest boiling ends being discarded. The heart cuts were of good quality as indicated by the following analyses:

*Chemical and physical tests on composite heart cut*

| Absorption of $KMnO_4$ wt. per cent | Acidity me/cc. | $H_3PO_4$ cc./5 cc. | Color APHA |
|---|---|---|---|
| 0.02 | 0.0011 | None | 60 |

This adiponitrile was continuously hydrogenated to hexamethylene diamine and excellent yields and catalyst life was obtained.

The major part of the adiponitrile dissolved in the treated and washed solution and retained in the distillation foreshots and residues may be recovered to obtain an overall recovery of pure material equivalent to 90 to 95 parts per 100 adiponitrile in the final refined crude. This recovery may be made as follows: The treating and washing solutions may be mixed and made alkaline with ammonia, if not already alkaline, and evaporated to about one-fifth of their original volume. The remaining liquid is then cooled to 30° C. An oil layer containing a great share of the adiponitrile rises to the top and may be decanted, washed with an equal volume of water, washed with aqua ammonia and distilled. The distillation foreshots and residues may be retreated as crude.

The dissolved foreshot and residual adiponitrile obtained in the two following examples may be recovered in a like manner to obtain an overall yield of 90 to 95%.

EXAMPLE 2

One hundred parts by weight of the adiponitrile similar to that described in Example 1 was agitated with a solution consisting of 61 parts water and 16.5 parts of concentrated $H_2SO_4$ in an open stainless steel kettle. A solution consisting of 8 parts $KMnO_4$ and 157 parts water was slowly added over a period of 3 hours. The mixture was agitated during the entire time of addition and the temperature was maintained between 30° C. and 50° C. The agitation was stopped, the mixture filtered and allowed to break into two layers. The lower layer was withdrawn leaving 89 parts of upper layer. The upper layer, containing most of the adiponitrile was washed 5 times with aqua ammonia solutions as described in Example 1. Approximately 2 parts of ammonia and 16 parts of water were used for each wash. Eighty parts of washed upper layer was obtained. Seventy-one parts of the treated and washed adiponitrile was fractionally distilled. Approximately 45 parts of pure adiponitrile suitable for continuous hydrogenation was obtained as indicated by the following tests:

*Chemical and physical tests on composite heart cuts*

| Absorption of $KMnO_4$ wt. per cent | Acidity milliequivalents/cc. | $H_3PO_4$ cc./5 cc. | Color APHA |
|---|---|---|---|
| 0.01 | 0.001 | None | 20 |

EXAMPLE 3

Seven hundred and three grams of colored adiponitrile (previously $SO_2$ treated but found unfit for continuous hydrogenation) was heated to 73° C. in an open glass flask. An aqueous solution of one gram of $KMnO_4$ per 100 grams of $KMnO_4$ solution was slowly added over a period of 10 hours. The mixture was agitated throughout the entire period of addition and was maintained at from 70° C. to 90° C. A total of 2600 grams of $KMnO_4$ solution was added. The agitation was stopped and the mixture allowed to cool and break into two layers. Three hundred and eighty-two grams of upper layer, largely adiponitrile, was obtained. This treated nitrile was fractionally distilled without prior washing or filtration. Chemical and physical tests indicated that the heart cuts were nearly pure and were suitable for continuous hydrogenation.

EXAMPLE 4

To 1000 grams of impure adiponitrile similar to that described in the preceding examples was added 150 grams of 10% $H_2SO_4$ in water solution. The solution was agitated and 100 grams of $K_2Cr_2O_7$ crystals were added rapidly. The temperature did not go above 50° C.

The mixture was agitated for two hours and then allowed to break into two layers. The upper (adiponitrile) layer was decanted and washed five times with 10% aqua ammonia. 300 grams of solutions were used for each wash. 758 grams of treated and washed adiponitrile were obtained and distilled. Two cuts from this distillation were analyzed and were found to have excellent properties as indicated by the following tests:

*Chemical and physical tests on composite heart cuts*

| Cut No. | $KMnO_4$ wt. per cent | Acidity milliequivalents/cc. | Color APHA |
|---|---|---|---|
| 3 | 0.005 | 0.0006 | 40 |
| 6 | 0.005 | 0.0006 | 40 |

I claim:

1. A process for the purification of an aliphatic dinitrile selected from the group consisting of adiponitrile and nitriles homologous with adiponitrile which comprises the steps of: (1) subjecting said aliphatic dinitrile to contact with an oxidizing agent selected from the group consisting of sodium and potassium dichromates and permanganates and their acidified solutions in water; and, (2) separating the resultant purified dinitrile by distillation.

2. A process for the purification of an aliphatic dinitrile selected from the group consisting of adiponitrile and nitriles homologous with adiponitrile which comprises the steps of: (1) subjecting said aliphatic dinitrile to contact with an oxidizing agent at a temperature below 50° C.; and, (2) separating the resultant purified dinitrile by distillation.

3. A process for the purification of an aliphatic dinitrile selected from the group consisting of adiponitrile and nitriles homologous with adiponitrile which comprises the steps of subjecting said aliphatic dinitrile to contact with an oxidizing agent selected from the group consisting of sodium and potassium dichromates and permanganates and their acidified solutions in water; (2) washing the resultant product with ammonia; and, (3) separating the resultant purified dinitrile by distillation.

4. The process for the purification of an aliphatic dinitrile selected from the group consisting of adiponitrile and nitriles homologous with adiponitrile which comprises the step of subjecting said dinitrile to contact with potassium permanganate and separating the resultant purified product by distillation.

5. A process for the purification of adiponitrile which comprises the steps of: (1) subjecting said adiponitrile to contact with an oxidizing agent selected from the group consisting of sodium and potassium dichromates and permanganates and their acidified solutions in water; and, (2) separating the resultant purified adiponitrile by distillation.

6. A process for the purification of adiponitrile which comprises the steps of: (1) subjecting adiponitrile to contact with an oxidizing agent selected from the group consisting of sodium and potassium dichromates and permanganates and their acidified solutions in water at a temperature below 50° C.; and, (2) separating the resultant purified adiponitrile by distillation.

7. A process for the purification of adiponitrile which comprises the steps of: (1) subjecting adiponitrile to contact with an oxidizing agent selected from the group consisting of sodium and potassium dichromates and permanganates and their acidified solutions in water; (2) washing the resultant product with ammonia; and, (3) separating the resultant purified adiponitrile by distillation.

8. A process for the purification of adiponitrile which comprises the step of subjecting adiponitrile to contact with potassium permanganate and separating the resultant purified adiponitrile by distillation.

9. A process for the purification of adiponitrile which comprises the steps of: (1) subjecting adiponitrile to contact with potassium permanganate; (2) washing the resultant product with ammonia; and, (3) separating the resultant purified adiponitrile by distillation.

10. A process for the purification of adiponitrile which comprises the steps of: (1) subjecting adiponitrile to contact with a solution of sulfuric acid, water and potassium permanganate; (2) washing the resultant product with ammonia; and, (3) separating the resultant purified adiponitrile by distillation.

11. A process for the purification of adiponitrile which comprises the steps of: (1) subjecting adiponitrile to contact with a solution of sulfuric acid, water and potassium permanganate; (2) washing the resultant product with an aqueous ammonia solution; and (3) separating the resultant purified adiponitrile by distillation.

12. A process for the purification of adiponitrile which comprises the steps of: (1) agitating adiponitrile with an aqueous solution of potassium permanganate containing a relatively small quantity of sulfuric acid; (2) washing the resultant solution with an aqueous ammonia solution; and, (3) separating the resultant purified adiponitrile by distillation.

13. A process for the purification of adiponitrile which comprises the steps of: (1) agitating adiponitrile with an aqueous solution of potassium permanganate containing a relatively small quantity of sulfuric acid; (2) washing the resultant solution with an aqueous ammonia solution; and, (3) separating the resultant purified adiponitrile by distillation, the adiponitrile content of the treating solution (sulfuric acid-potassium permanganate-water) and the washing solutions (water-ammonia) being recovered by: (1) evaporation and cooling of these solutions followed by removal of the resultant upper layer and retreatment thereof with potassium permanganate.

14. A process for the purification of adiponitrile which comprises the steps of: (1) subjecting adiponitrile to contact with potassium dichromate; (2) washing the resultant product with ammonia; and, (3) separating the resultant purified adiponitrile by distillation.

WALTER V. OSGOOD.